United States Patent [19]

Allen

[11] Patent Number: 4,549,834
[45] Date of Patent: Oct. 29, 1985

[54] ASPHALT REJUVENATING COMPOSITION AND PROCESS

[75] Inventor: Jerry R. Allen, Des Moines, Iowa

[73] Assignee: Pester Refining Company, Des Moines, Iowa

[21] Appl. No.: 536,990

[22] Filed: Sep. 29, 1983

[51] Int. Cl.$^4$ .................. E01C 7/18; C08L 95/00
[52] U.S. Cl. .................................. 404/75; 404/17; 106/278
[58] Field of Search ............... 404/75, 90–92, 404/17; 106/281 R, 278, 279

[56] References Cited

U.S. PATENT DOCUMENTS

| | | | |
|---|---|---|---|
| 2,507,629 | 5/1950 | Gallagher | 404/17 X |
| 2,691,621 | 10/1954 | Gagle | 106/279 X |
| 3,096,192 | 7/1963 | Pitchford | 106/281 R |
| 3,563,778 | 2/1971 | Corbett et al. | 106/278 |
| 3,939,004 | 2/1976 | Corbett | 106/281 R X |
| 4,011,023 | 3/1977 | Cutler | 404/91 |
| 4,124,325 | 11/1978 | Cutler | 404/75 |
| 4,125,459 | 11/1978 | Garwin | 208/309 |
| 4,278,469 | 7/1981 | Yan et al. | 106/278 |
| 4,437,896 | 3/1984 | Partanen | 106/281 R X |
| 4,473,320 | 9/1984 | Register | 404/75 X |

OTHER PUBLICATIONS

"Recycling Asphalt Proves Economical for Paving Contractors," *Compressed Air Magazine*, Sep. 1982, pp. 14–17.

Speech presented at NPRA Annual Meeting, Mar. 21–23, 1983.

Dale E. George Speech presented at Advisory Board meeting of National Asphalt Pavement Association, May 8, 1981.

Primary Examiner—Stephen J. Novosad
Assistant Examiner—Beverly E. Hjorth
Attorney, Agent, or Firm—Zarley, McKee, Thomte, Voorhees & Sease

[57] ABSTRACT

The process and composition for improving asphalt paving by mining existing roads for their asphalt content, blending the mined or recycled asphalt with new asphalt which is unusually high in resin content to provide a pavement of increased ductility and improved penetration characteristics which will wear better.

14 Claims, 1 Drawing Figure

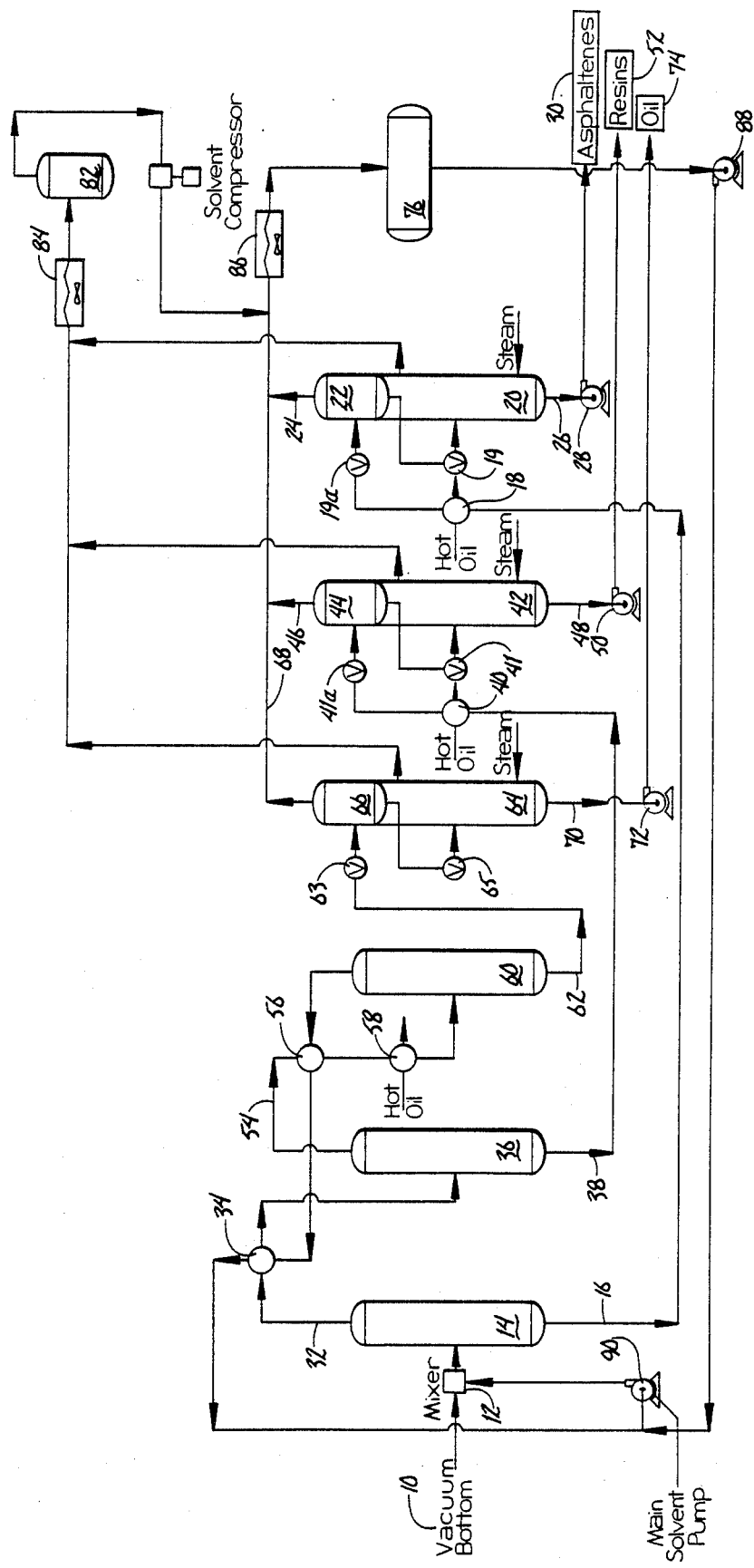

ASPHALT REJUVENATING COMPOSITION AND PROCESS

BACKGROUND OF THE INVENTION

It has long been felt that the chemical composition of asphaltic cement will determine its quality, which in turn will ultimately influence the performance of bituminous, or in other words, asphaltic, roadways. However, it has not heretofore been known what precisely needs to be done to the chemical composition of asphaltic cement in order to improve its road characteristics.

There are several factors which are responsible for overall performance of an asphaltic roadway. Many of these are beyond the control of those who make roadways. Some of those major factors appear to be the subgrade and base course quality, environment, construction quality, aggregate quality, asphalt quality, age of the road, and the roadway traffic load. Obviously, changes in any one of these factors will alter the dynamic interaction of all, and the life of the road. One of these factors, which is under the control of those making the road, is the chemical composition of the asphalt cement.

It has heretofore been known and theorized extensively that the chemical composition will determine the asphalt's capability to interact properly with the other mentioned non-controllable factors. However, it has not heretofore been known how to precisely manipulate the asphaltic chemical composition in order to desirably improve bituminous pavement performance.

Common physical tests of asphaltic cement which are performed measure ductility, penetration and viscosity. Those measurements will be referred to herein from time to time as a measure of durability and performance.

Asphaltic pavement comprises the largest portion of the roadways in the United States. The life of those roads will vary greatly depending upon the conditions heretofore mentioned. One of the more important is weather conditions. For example, roadways in mild climates are not subjected to the freeze-thaw cycle and thus could reasonably be expected to have longer life. However, even within the same climatic area, it has been observed from time to time that some roads will crack in an "alligator pattern fashion" very shortly after laying; whereas, other roads in the same area will last much longer. Much speculation has in the past centered around the reasons for such observations, without really knowing the "why".

Accordingly, it is a primary objective of the present invention to control the chemical composition of asphalt such that it alters the normal road deterioration characteristics, thus delaying the period of time it takes for a typical asphaltic road to get harder, and more brittle, and crack.

Another primary objective of the present invention is to allow the reclamation of older asphaltic roads by allowing the "mining" of the road. In other words, the older road is torn up, pulverized and then mixed with aggregate and the "tailor-made" asphaltic compositions to provide a rejuvenated mixture which can then be relaid on the highways.

Another objective of the present invention is to provide economical, reduced cost, repaving techniques which rejuvenate and increase the life of asphaltic roads.

A still further objective of the present invention is to provide a rejuvenating composition, method and technique which allows mining of existing roads and use in both cold mix recycling processes and hot mix recycling processes.

Yet another objective of the present invention is to separate asphalt bottoms into three distinct ingredients, asphaltenes, resins, and oils which may be admixed, at will, to provide controlled ductility and penetration characteristics of a repaved or reclaimed road.

The method of accomplishing these objectives, as well as others, will be evident from the detailed description which follows.

It has, of course, been suggested in the past that one might recycle or "mine" existing asphalt roads, see, for example, *Compressed Air Magazine*, September 1982 at pages 14 through 17, which is incorporated herein by reference. It has also been suggested in the past that asphalt bottoms may be separated further into heavier and lighter fractions, see for example, Garwin, U.S. Pat. No. 4,125,459, issued Nov. 14, 1978. It has not, however, heretofore been known how to take advantage of known separation technology, such as that expressed in the Garwin patent, in order to tailor-make the composition of asphalt to substantially increasing road life.

BRIEF DESCRIPTION OF THE DRAWINGS

FIG. 1 shows a flow diagram of a typical solvent extraction process which may be utilized to separate asphalt bottoms, for use in the blending process of this invention.

DETAILED DESCRIPTION OF THE INVENTION

The beginning material for use in the process of this invention is the heavier or high viscosity, high boiling point components of crude oil. These are commonly referred to as the residuum, or vacuum, or asphalt bottoms. It is the remaining material left from crude oil refining, whether by thermal cracking, catalytic cracking, coking, solvent extraction, or the like.

The basic chemical components of asphalt are known to be asphaltenes, resins, and oils. In accordance with the process of this invention, by use of one or the other of the extraction processes presently known, the bottoms are separated into the oil component, the resin component and pitch or asphaltenes. Typically, the bottoms, prior to any separation, will comprise about 65% of the oil component, about 10–12% of the resin component, and about 23–25% of asphaltenes or pitch.

This is the common binding material used with aggregate to prepare asphalt roads. Commonly this material is mixed at levels of 10% by weight or less with from about 90% or greater amounts of road aggregate material. A very typical formulation is 94% by weight paving aggregate (sand, pebbles, soil, etc.) and 6% asphalt component. The method of mixing and laying of the pavement may be in accordance with the traditional hot mix process or cold mix recycled processes, as disclosed in the previously referred to magazine article appearing in *Compressed Air Magazine*.

It has now been found that asphalt roadways can be significantly improved if the amount of resin, which is typically within the range of 10–12% by weight of the asphalt component, is substantially increased to within the range of from about 40% to about 60% by weight of the asphalt component. This significantly increased resin level will result in a roadway of much longer life, of increased ductility and of improved penetration (hardness) characteristics.

The original separation of the bottom into its three basic components of oil (commonly referred to as "DAO", that is deasphalted oil), resin, and pitch, can be by many different solvent extraction techniques. One for illustration is shown in the drawing.

It is generally the process shown in U.S. Pat. No. 4,125,459, which is incorporated by reference, and thus will be described only in general terms. It is to be understood that other effective solvent extraction processes which will separate asphalt into its three basic components, could also be employed.

Vacuum bottoms 10 are changed into a fixed element inline mixer 12, where the bottoms are contacted with several volumes of isobutane solvent, at elevated temperature and pressure (i.e., 230° F. and 740 psig). This material then enters an asphaltene separator 14, where a phase separation occurs. Asphaltene pitch is withdrawn from the bottom via line 16 and pressurized through a heat exchanger 18 valve 19a to the asphaltene flash drum 22 and valve 19 to the asphaltene stripper 22, where residual traces of solvent are removed via line 24. The asphaltene pitch product leaves via line 26 and is pumped via pump 28 to the asphaltene storage tank 30.

The overhead from the asphaltene separator 14 flows via line 32 through heat exchanger 34 to the resin separator 36. As a result of increased temperature 290° F. and 675 psig), a phase separation occurs in the resin separator where resins are withdrawn from the bottom via line 38. Resins are pressurized (428° F. and 660 psig) through a heat exchanger 40 and valve 41a to the resin flash drum 44 and valve 41 to the resin stripper 42 where residual traces of solvent are removed via line 46. The resin is withdrawn via line 48 and pumped via pump 50 into resin storage tank 52.

The overhead from the resin separator 36 flows via line 54 through two heat exchangers 56 and 58 to oil separator 60. There, as a result of increased temperature (340° F. and 650 psig), an oil phase separates from the solvent. The oil is withdrawn via line 62 where it enters the oil stripper 64 via valve 63 and 65 and flash drum 66. Residual solvent is stripped via line 68 and recycled to the solvent container. The stripped oil leaves tank 64 via line 70 and is pumped via pump 72 to the oil tank 74.

The needed solvent in the line is circulated from solvent tank 76 via the lines as shown, and via solvent compressor 78. Heat is supplied to the solvent via hot oil belt 80.

Vaporized solvent is removed in the flash drums 22, 44 and 66, and collected in the solvent surge drum 76. The main source of solvent is solvent storage tank 82 and drum 76, with the solvent air coolers 84, 86 used for temperature control, and the main solvent driving pumps are 88 and 90.

It thus can be seen that in this representative extraction process, utilizing isobutane as the extracting solvent, one effectively separates bottoms into their respective deasphalted oil component, resin component and pitch component. This separation allows the reblending, at the operator's choice, to tailor-make an asphalt of desired composition and characteristics.

No further detailed mention will be made of the solvent extraction process, since it is not itself the invention, but only one illustration of the separation technique. The important point is, that so long as the resins and the pitch are combined in a single stream, the material produced by any solvent extraction process cannot be utilized. Resin and pitch must be separated from each other. It is, however, allowable to have the oil and resin combined in a single stream as long as they are collectively separated from the pitch. Thus, in order to control the resin content, if oil and resin are together, one merely needs to use higher weight percentages of the combined composition.

As heretofore mentioned, through the aging process, asphalt cracks by and large because of changes in chemical composition caused by heat, ultraviolet light, pressure, chemical reactions with the chemical components of the base aggregate, and the like. It has been discovered that the primary process variable having the greatest effect upon the stability of the asphalt is the resin content.

Normal asphalt component has a resin content of from about 10% to about 12% by weight. The asphalt component useful for making improved road compositions of increased durability in accordance with this invention has an oil content of from about 30% to about 50% by weight of the asphalt component, a resin content of from about 40% to about 60% by weight of the asphalt component, and a pitch content of from about 3% to about 20% by weight of the asphalt component. It is preferred that the oil content be from about 30% to about 40% by weight of the asphalt component, the resin content from about 40% to about 50% by weight of the asphalt component, and the pitch content from about 5% to about 10% by weight of the asphalt component. The most preferred composition (best mode presently known) for the asphalt component of the paving composition used in this invention is oil 34.0 by weight of the asphalt component, resin varying at the level of 59% by weight of the asphalt component, and pitch being about 7% by weight of the asphalt component.

The composition can be successfully used in reclaiming techniques wherein a majority of the asphalt paving is that from old roads, i.e., is "mined" from old roads. When one is reclaiming or recycling asphalt, the composition useful for this invention can be 50% of the recycled paving composition, and 50% of fresh composition which employs the tailored asphalt of this invention with the high resin content, in conjunction with fresh aggregate.

It should be mentioned that for the asphalt component itself, percentages are expressed as percentages by weight of the asphalt component, and do not include base aggregate. In the reclaimed roads, of course the asphalt component which remains in the 50% portion of old paving aggregate, is uncontrolled, with only that portion added to the 50% portion which is fresh composition being controlled.

The following examples relate to asphalt paving which is actually in use on an experimental basis in the State of Kansas.

EXAMPLES

In accordance with the previously described isobutane solvent extraction process, asphalt bottoms were separated into their asphaltenes or pitch component, their resin component and their oil component. These were recombined to provide products which had oil, resin, and pitch levels as specified in the table below, samples 1 and 2. In addition, the flash point and the viscosity is reported.

| Tailored Asphalt Measurements | | |
| --- | --- | --- |
| PROPERTY | Sample 1 | Sample 2 |
| Viscosity, 140° Cst | 1000–4000 | 5000–15,000 |
| Flash Point, COC °F. | 425 min. | 450 min. |

Sample 1 had a deasphalted oil content of about 54% by weight, a resin content of about 42.75% by weight, and a pitch content of 3.25% by weight. Sample 2 had an oil content of about 38% by weight, a resin content of about 55% by weight, and a pitch content of 7.3% by weight.

Samples 1 and 2 as mentioned above, were used in a hot mix, as a hot mix recycling agent. In particular, it was mixed with aggregate which was recycled, at the 50% weight level, with the asphalt portion of the 50% fresh material being samples 1 or 2, as specified.

In the first example, 13.016 miles of road in Kansas were recycled. The road was cold milled with a rotary drum teeth press to remove the approximately top one and one-quarter inches of asphalt composition, with the total amount removed being 687.24 stations, which corresponds to roughly 13.016 miles. The reclaimed material was then pulverized to provide 10,554 tons of material. An equivalent amount of fresh aggregate, that is, 10,544 tons, was prepared with the addition of 312 tons of sample number 1 as the recycling agent. The material was all hot mixed in conventional fashion as described in the *Compressed Air Magazine* article previously incorporated herein by reference. It was then brought back to the road site and 55 tons of emulsified asphalt tack was sprayed onto the bed to allow good tacking between the surface and the reapplied aggregate. Additional aggregate of 34,827 tons was used for stabilizing the road shoulders. One hundred forty-three tons of calcium chloride and 20,000 gallons of water was used during the application process.

This road has now been down for in excess of 11 months, and has been routinely used. It has been inspected periodically. The periodic inspections reveal that this road has essentially shown no visible signs of wear during this period. There is a distinct absence of cracks and brittleness.

A similar road composition was laid with sample 2 in a similar manner at another place in Kansas. This totaled 7.475 miles. Cold milling was to a nominal depth of 1¾ inches for 394.68 stations. The process reclaimed material was pulverized to provide a total of 9,016 tons. Fresh rock and sand aggregate was added to provide an equivalent amount of 9,016 tons. The sample number 2 recycling or rejuvenating agent was added at a level of 483 tons. The amount of tack employed wass 32 tons.

This road has likewise been down for a total of about 11 months. Periodic inspection after normal use again reveals no cracks and brittleness, good ductility and good penetration charactistics. Both the road in this example employing sample 2, and the road employed in sample 1, showed much evidence of wear, deterioration, cracking and brittleness prior to the rejuvenation process.

It can thus be seen that the invention accomplishes at least all of its stated objectives.

What is claimed is:

1. An asphaltic composition especially suitable for rejuvenating recycled asphalt-aggregate road compositions, consisting essentially of from about 30% by weight to about 50% by weight of asphaltic oils, from about 40% by weight to about 60% by weight of asphaltic resins, and from about 3% by weight to about 20% by weight of asphaltic pitch.

2. The composition of claim 1 wherein the amount of asphaltic oils is from about 30% by weight to about 40% by weight.

3. The composition of claim 2 wherein the amount of asphaltic pitch is from about 5% by weight to about 10% by weight.

4. The composition of claim 1 wherein the amount of asphaltic oil is about 34%, the amount of asphaltic resin about 59%, and the amount of asphaltic pitch about 7%.

5. The method of improving road life of asphaltic roads which are made of substantial amounts of old, reclaimed road aggregate which includes the old worn asphalt, in combination with an asphalt binder, consisting essentially of:
employing as the asphaltic binder a high resin content asphalt, with a resin content within the range of from about 40% by weight to about 60% by weight of the asphalt binder component.

6. The method of claim 5 wherein the asphalt binder component comprises from about 30% by weight to about 50% by weight asphaltic oils, and from about 3% by weight to about 20% by weight asphaltic pitch.

7. The method of claim 6 wherein the asphaltic binder component copmprises from about 30% by weight to about 40% by weight of asphaltic oil.

8. The method of claim 7 wherein the asphaltic binder component comprises from about 3% by weight to about 20% by weight of asphaltic pitch.

9. The method of claim 5 wherein the amount of road aggregate is from about 90% to about 95% of the paving composition and the amount of asphaltic binder about 5% to about 10% by weight of the road composition.

10. A method of rejuvenating hard, cracked and brittle asphaltic roadways consisting essentially of:
breaking up the hard, cracked, and brittle asphaltic roadway,
pulverizing the break-up material to a reusable size;
mixing the pulverized material with high resin content asphaltic emulsion having a resin content of from about 40% to about 60% by weight of said high resin asphaltic emulsion to provide a rejuvenated composition, and
re-laying the roadway with said rejuvenated composition.

11. The method of claim 10 wherein the mixing is a cold mix recycle step.

12. The method of claim 10 wherein the mixing is a hot mix recycle step and includes, in addition, fresh aggregate.

13. The method of claim 12 wherein the rejuvenated road is about 50% by weight pulverized old roadway and about 50% by weight of a composition of fresh aggregate containing said high resin content asphaltic emulsion.

14. The method of claim 13 wherein the fresh aggregate portion itself comprises about 90% to about 95% road aggregate and from about 5% to about 10% by weight of the high resin asphaltic component.

* * * * *